(12) United States Patent
Audeon et al.

(10) Patent No.: US 8,390,904 B2
(45) Date of Patent: Mar. 5, 2013

(54) SCANNER DEVICE FOR A FRANKING SYSTEM

(75) Inventors: David Audeon, Massy (FR); Francis Coret, Gournay sur Marne (FR)

(73) Assignee: Neopost Technologies, Bagneux (FR)

( * ) Notice: Subject to any disclaimer, the term of this patent is extended or adjusted under 35 U.S.C. 154(b) by 827 days.

(21) Appl. No.: 12/569,578

(22) Filed: Sep. 29, 2009

(65) Prior Publication Data

US 2010/0091346 A1    Apr. 15, 2010

(30) Foreign Application Priority Data

Sep. 29, 2008 (FR) .................................. 08 56533

(51) Int. Cl.
    *H04N 1/04* (2006.01)
    *H04N 1/024* (2006.01)
(52) U.S. Cl. ......... 358/498; 358/477; 358/474; 358/473
(58) Field of Classification Search .................. 358/474, 358/498, 473, 477
    See application file for complete search history.

(56) References Cited

U.S. PATENT DOCUMENTS

| | | | | |
|---|---|---|---|---|
| 5,493,106 | A | * | 2/1996 | Hunter .......................... 235/375 |
| 6,321,214 | B1 | * | 11/2001 | Thiel .............................. 705/408 |
| 7,558,761 | B2 | * | 7/2009 | Kummer et al. .............. 705/401 |
| 2002/0109288 | A1 | * | 8/2002 | Bernard et al. ................ 271/264 |
| 2005/0071294 | A1 | * | 3/2005 | Rios et al. ...................... 705/404 |
| 2005/0171869 | A1 | * | 8/2005 | Minnocci ........................ 705/28 |

\* cited by examiner

*Primary Examiner* — Akwasi M Sarpong
(74) *Attorney, Agent, or Firm* — Sughrue Mion, PLLC

(57) ABSTRACT

A scanner device for scanning mailpieces, which scanner device comprises: a contact image sensor or "CIS" disposed in a direction perpendicular to the conveying direction in which the mailpieces are conveyed through a module of a franking system; a support to which said sensor is fastened, the support being mounted to pivot at one end of at least one first drive lever, the other end of which is itself mounted to pivot about a first common hinge pin secured to a stationary portion of the module and disposed upstream from a set of conveyor rollers, so as to make it possible for said contact image sensor to move vertically; and at least one second drive lever one end of which is mounted to pivot about a second common hinge pin secured to said stationary portion of said module and disposed downstream from said set of conveyor rollers, the other end of the second drive lever, by being moved synchronously with the vertical movement of said set of conveyor rollers, moving the contact image sensor via the first drive lever.

9 Claims, 4 Drawing Sheets

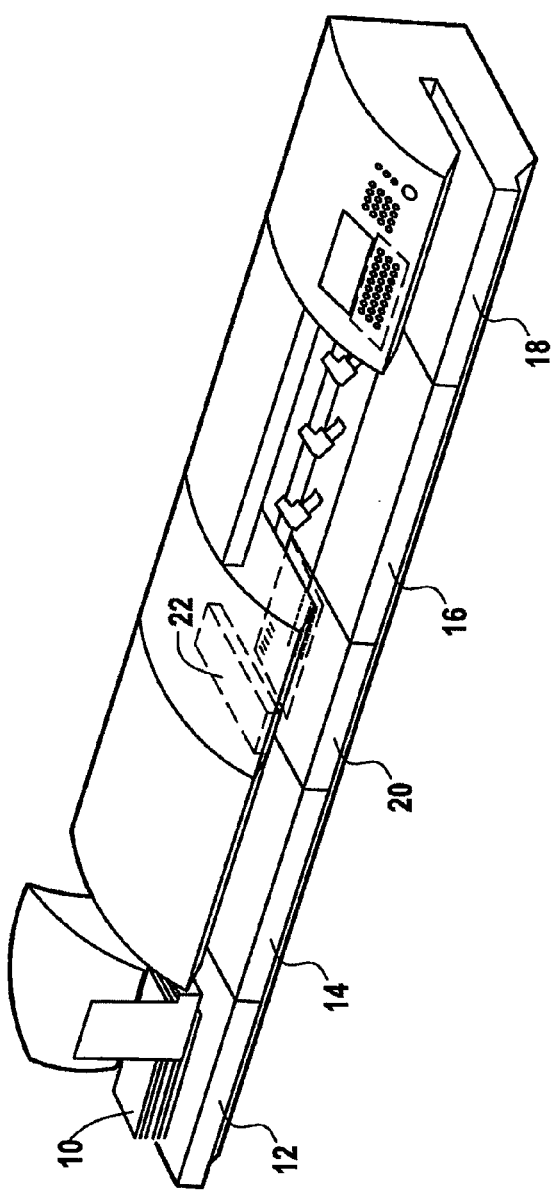

SCANNER DEVICE FOR A FRANKING SYSTEM

TECHNICAL FIELD

The present invention relates exclusively to the field of mail handling, and it relates more particularly to a scanner device that is suitable for being integrated into an independent module or into any one of the various modules making up a franking system, such as the mailpiece feed module (or "feeder"), the mailpiece weigh module (postal scales), the mailpiece print module (franking machine or "postage meter" proper), or indeed the folding and insertion module (mailpiece folder/envelope stuffer).

PRIOR ART

It is well known that postal authorities or private carriers use complex scanning systems making numerous monitoring and tracking applications possible, in particular for analyzing mailpieces and for sorting them by destination. Unfortunately, those systems are particularly costly, and they are voluminous, in particular because of the use of cameras. They are therefore genuinely advantageous only for a sender who sends large volumes of mail, such as a dispatcher. Scanning mailpieces by means of such technologies is out of the question in a standard franking system that is disposed in a firm's mail room, and that is formed, for example, of a feeder and of a franking machine, and optionally of postal scales and/or of a folder/stuffer.

For such conventional franking systems, it is necessary to use sensors of small size, of the Contact Image Sensor (CIS) type, as currently used, above all, in the scanning units of photocopiers. Unfortunately, in such photocopiers, although the CIS disposed behind the photocopier window can move from one end of the window to the other, it is generally positioned at a determined and fixed distance (height) from said window, and thus from the document to be photocopied, regardless of the thickness of said document.

The same does not apply with a franking system. The top faces of the mailpieces are not always plane, and differences in thickness due to their contents or to shape defects resulting from them being conveyed through the system can degrade the quality of the scanning. In addition, the width of the scanned zone is relatively large, and typically greater than 30 centimeters (cm). Depending on the format of the mailpiece, the position of the address of the recipient differs, and it is desirable to be able to scan not only the recipient address but also the other information visible on the mailpiece (amount of the franking or "postage", sender's address, etc.).

A first solution to those problems is given by the scanner device specially adapted to franking systems and illustrated in the Applicant's Patent Application FR 07 57285. In that device, which is placed at a variable height rather than being at a fixed height, the mailpieces are conveyed while keeping a common reference that is the bottom faces of the mailpieces. Thus, regardless of the thickness of the mailpiece, its bottom face thus always passes through the system at the same place.

That device is generally satisfactory in particular for low or medium franking rates. Unfortunately, for high franking rates, it suffers from certain drawbacks mainly resulting from the amplitude of the movement of the sensor, which amplitude can be as large as a few tens of millimeters (mm). The sensor must move vertically by a value equal to the thickness of the mailpiece (which thickness can vary in the range 0.2 mm to more than 20 mm), and the position of the sensor relative to the top face of the mailpiece then varies significantly as a function of that thickness, as shown in FIG. 6, thereby leading to frequent impacts with the leading edge of the mailpiece. Thus, for a mailpiece that has a thickness of about 5 mm, since the sensor is situated more than 2 mm below the top face of the mailpiece, i.e. much too low relative to said mailpiece, a considerable impact with the sensor occurs when said mailpiece arrives.

In addition, in order to raise the sensor by a value substantially equal to the thickness of the mailpiece, and in order to guarantee an accurate vertical position for the sensor, it is necessary for the suspension arm to have a bottom geometrical shape that is specific, with an inclined plane and a rounded shape that require machining with very tight manufacturing tolerances and thus a high cost.

OBJECTS AND DEFINITION OF THE INVENTION

An object of the present invention is therefore to mitigate the above-mentioned drawbacks by installing a CIS sensor in a franking system, which sensor makes it possible to scan the entire surface of each of the mailpieces correctly, regardless of the format (from the business card format to the largest format) and of the thickness of said mailpiece. Another object of the invention is to enable said sensor to adapt to accommodate the movements and the surface defects of the mailpiece, while also enabling the scanning to be of quality sufficient to make it possible to use character recognition software to analyze the scanned images. Yet another object of the invention is to control the distance between the sensor and the mailpiece fully, thereby guaranteeing good scanning quality.

These objects are achieved by a scanner device for scanning mailpieces, which scanner device comprises, disposed downstream from a set of conveyor rollers for conveying said mailpieces through a module of a franking system:
  a contact image sensor or "CIS" disposed in a direction perpendicular to the conveying direction in which the mailpieces are conveyed through said module; and
  a support to which said sensor is fastened, said support being mounted to pivot at one end of at least one first drive lever, the other end of which is itself mounted to pivot about a first common hinge pin secured to a stationary portion of said module and disposed upstream from said set of conveyor rollers, so as to make it possible for said contact image sensor to move vertically;
wherein said scanner device further comprises at least one second drive lever one end of which is mounted to pivot about a second common hinge pin secured to said stationary portion of said module and disposed downstream from said set of conveyor rollers, the other end of said second drive lever, by being moved synchronously with the vertical movement of said set of conveyor rollers, moving said contact image sensor via said first drive lever.

In a preferred embodiment, at a determined distance from said second common hinge pin, said second drive lever is provided with a raise bar designed to co-operate with a bearing zone of said first drive lever to raise said first drive lever under the action of said vertical movement of said set of transport rollers, thereby positioning said contact image sensor relative to a top face of said mailpiece substantially identically regardless of the thickness of said mailpiece.

Thus, by means of this simple double-lever structure, it is possible to maintain the position of the sensor relative to the top face of the mailpiece almost constant for all thicknesses of mailpiece and, by limiting the impacts with the mailpieces, to improve the quality of the scanning. In addition, the device is no longer subjected to narrow manufacturing tolerances that increase its cost.

Preferably, said determined distance lies in the range 75% of the total length of said second drive lever to 76% of the total length of said second drive lever.

Advantageously, in the absence of any mailpiece, clearance is provided between said bearing zone and said raise bar so as to offset the raising of said contact image sensor relative to the vertical movement of said set of conveyor rollers.

Preferably, said second common hinge pin is disposed at a height greater than the maximum thickness of each of said mailpieces that can be conveyed through said module.

Advantageously, each of said first and second drive levers is in the shape of a bridge whose curvature is accentuated so that the two levers together substantially form an upside-down W figure.

Said contact image sensor is formed of an integrated module comprising adjacent semiconductor detector cells, collimation optics, and a light system.

Depending on the available space, the scanner device may be mounted in an independent module of the franking system, or in one of the following modules of the franking system: feeder; postal scales; franking machine; and folder/stuffer.

The invention also provides any module of a franking system that includes such a scanner device.

BRIEF DESCRIPTION OF THE DRAWINGS

The invention can be better understood on reading the following detailed description of non-limiting illustrative examples given with reference to the following figures, in which:

FIGS. 1 and 2 are overall views of franking systems implementing the invention;

DETAILED DESCRIPTION OF EMBODIMENTS

Figure 3:
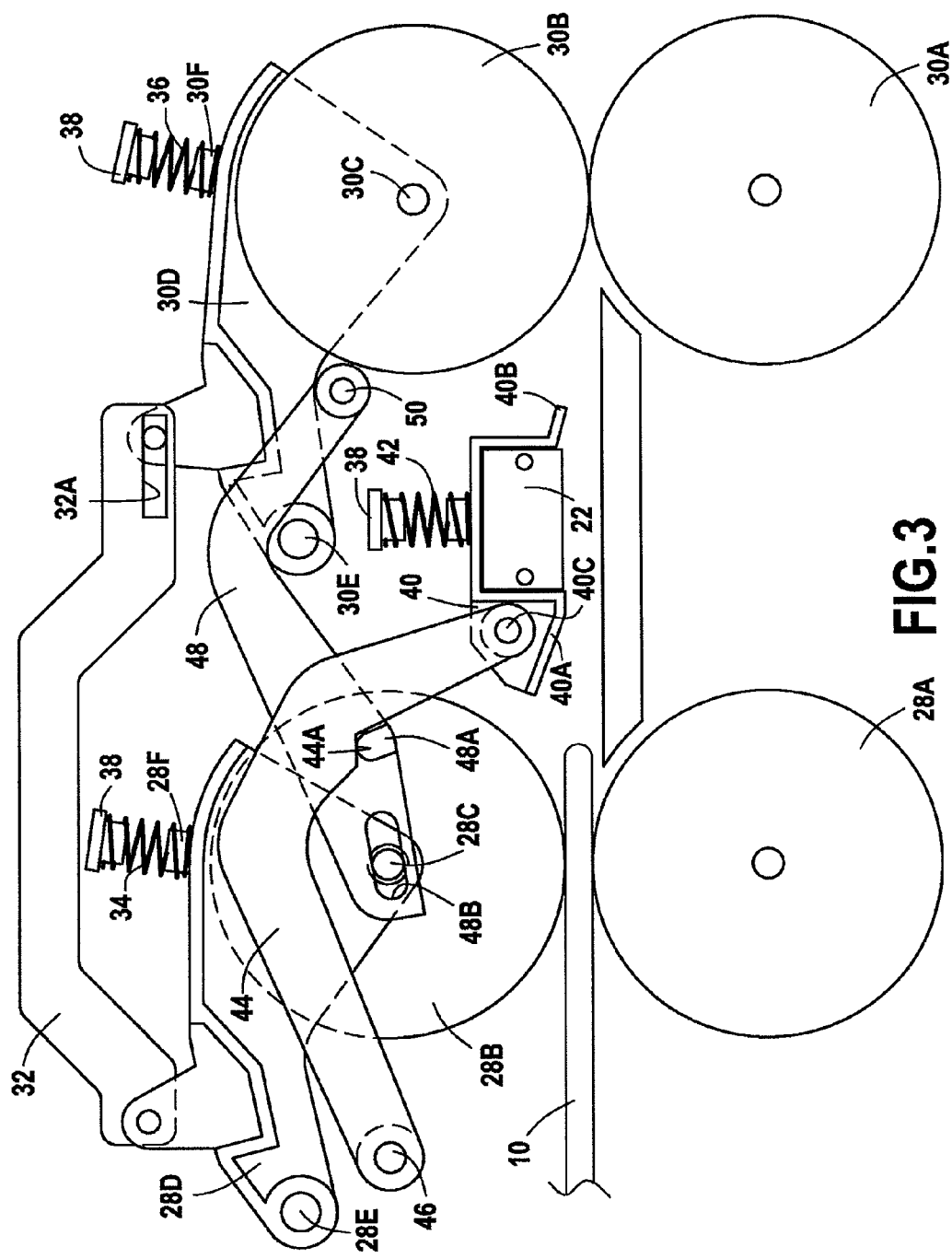
FIGS. 3 and 4 are views respectively in section and in perspective showing an embodiment of the invention.

FIG. 1 shows a first embodiment of a mailpiece franking system that, as is known, and disposed from upstream to downstream relative to the advance direction in which the mailpieces 10 advance, includes: a mailpiece feed module 12 designed to receive a stack of mailpieces that are preferably mixed (i.e. of different sizes and weights); a selector and conveyor module 14 for selecting and conveying the mailpieces one-by-one; preferably a dynamic weigh module 16 for determining the weight and optionally the size of each selected mailpiece; and a print module 18 designed to print a postal imprint on each of the mailpieces selected one-by-one and weighed in this way. As is also known, the print module is preferably connected to a server (not shown) of a dealer of said franking system, which server is itself connected to a server (not shown) of a postal authority or of a private carrier handling delivery of the mail.

In this first embodiment that is shown, the franking system further includes an independent module 20 that is disposed upstream from the dynamic weigh module (but some other configuration is also possible), so as to acquire a digital image of the mailpiece 10, and so as to extract therefrom various data necessary for processing it and tracking it, such as the recipient address or a unique identifier borne by the mailpiece. For this purpose, the module has a scanner device provided with an image sensor 22 associated with bar code recognition software and with optical character recognition (OCR) software. The print module also has an improved user interface with a keyboard making it possible to display on a screen all or some of the image of the mailpiece scanned in this way and, if necessary to correct the postal data extracted from said image. The keyboard can be a physical keyboard interacting with a virtual keyboard of the screen which is then advantageously of the touch-sensitive type, or else it can be quite simply replaced with such a touch-sensitive screen. The print module can also have storage means (not shown) of the database type for storing the image of the envelope scanned in this way.

The sensor is advantageously a Contact Image Sensor (CIS) of the linear type whose length is designed to scan at least a width of a mailpiece that covers the postal imprint and the recipient address, regardless of the format of said mailpiece. The linear optical sensor is typically an integrated module having adjacent semiconductor Charge Coupled Device (CCD) or Complementary Metal Oxide Semiconductor (CMOS) detector cells, collimation optics, and a lighting system which, when it is activated, lights the surface on which the sensor is positioned and delivers, in return, at each of the detector cells, a signal proportional to the light reflected by the surface of the mailpiece.

Another embodiment of a franking system is shown in FIG. 2. As is known, and disposed from upstream to downstream relative to the advance direction in which the mailpieces 10 advance, it includes: a feed, select, and convey module 24 designed to receive a stack of mailpieces that are preferably mixed (i.e. of different sizes and weights, to select the mailpieces one-by-one, and to convey them one-by-one to a print module 26 designed to print a postal imprint on each of the mailpieces selected one-by-one in this way. As above, the print module can be connected to a server (not shown) of a dealer of the franking system. In this second embodiment, the image sensor 22 of the scanner device that is designed to acquire the digital image of the mailpiece 10, and to extract therefrom the various data necessary for processing it and tracking it is no longer disposed in an independent module but rather it is disposed directly in the feed module 24. Naturally, as above, the image sensor is associated with bar code recognition software and with OCR software, and the print module 26 has a user interface that is suitable, if necessary, for correcting OCR errors.

FIG. 3 is a more detailed view showing how the linear contact image sensor 22 is mounted between the conveyor rollers of the independent module 20 of FIG. 1 or of the feed module 24 of FIG. 2. Each of those modules has a plurality of conveyor rollers formed of at least one set of superposed conveyor rollers for conveying the mailpieces through the module in question and more particularly, for example, of two adjacent sets of superposed conveyor rollers, namely a set of front rollers 28A & 28B, and a set of back rollers 30A & 30B. As is known, the upper rollers 28B, 30B of said sets are mounted to be free to rotate about transverse rotation pins 28C, 30C that extend transversely to the conveyor path along which the mailpieces are conveyed, and that are secured to forks or yokes 28D, 30D for supporting said rollers, which forks are interconnected by a tie 32, one end of which is provided with a slot 32A. In order to adapt to accommodate the various thicknesses of the mailpieces, each of said forks can pivot independently and vertically about a respective stationary hinge pin 28E, 30E in opposition to resilient means 34, 36, one end of each of which is in engagement with a top stud 28F, 30F on the respective roller-support fork, the other end being secured to a stationary portion 38 of the module. The lower rollers 28A, 30A (which could advantageously be replaced with a belt) are motor-driven and are actuated synchronously by various control and monitoring means that are necessary for them to operate and that are known and therefore do not need to be described in any further detail below.

The linear contact sensor 22 is thus disposed downstream from the set of superposed conveyor rollers 28A, 28B, and said linear contact sensor is mounted in a moving support 40 that is free both to move vertically in opposition to resilient means 42 and also to pivot about a longitudinal pin 40C, the resulting mobility making it possible for the sensor to track the top surface of the mailpiece that is not uniform, and thus, by moving and by its privileged position in the module, to guarantee optimum scanning quality regardless of the thickness of the mailpieces, in particular when thick envelopes are present. This scanning and the automatic recognition of the various data borne by the mailpiece are performed by processor means (not shown) formed simply by a programmable circuit, as described in the patent application mentioned in the introduction, and synchronized on the basis of pulses from a rotary encoder or merely by detection of changes in light intensity that appear systematically on going from one mailpiece to another. Appropriate OCR or bar code recognition software present in memory means associated with the processor means then make it possible to recognize the address data or code data printed on the mailpieces, and, if necessary, to create a database for addresses and for tracking of said mailpieces.

Figure 4:
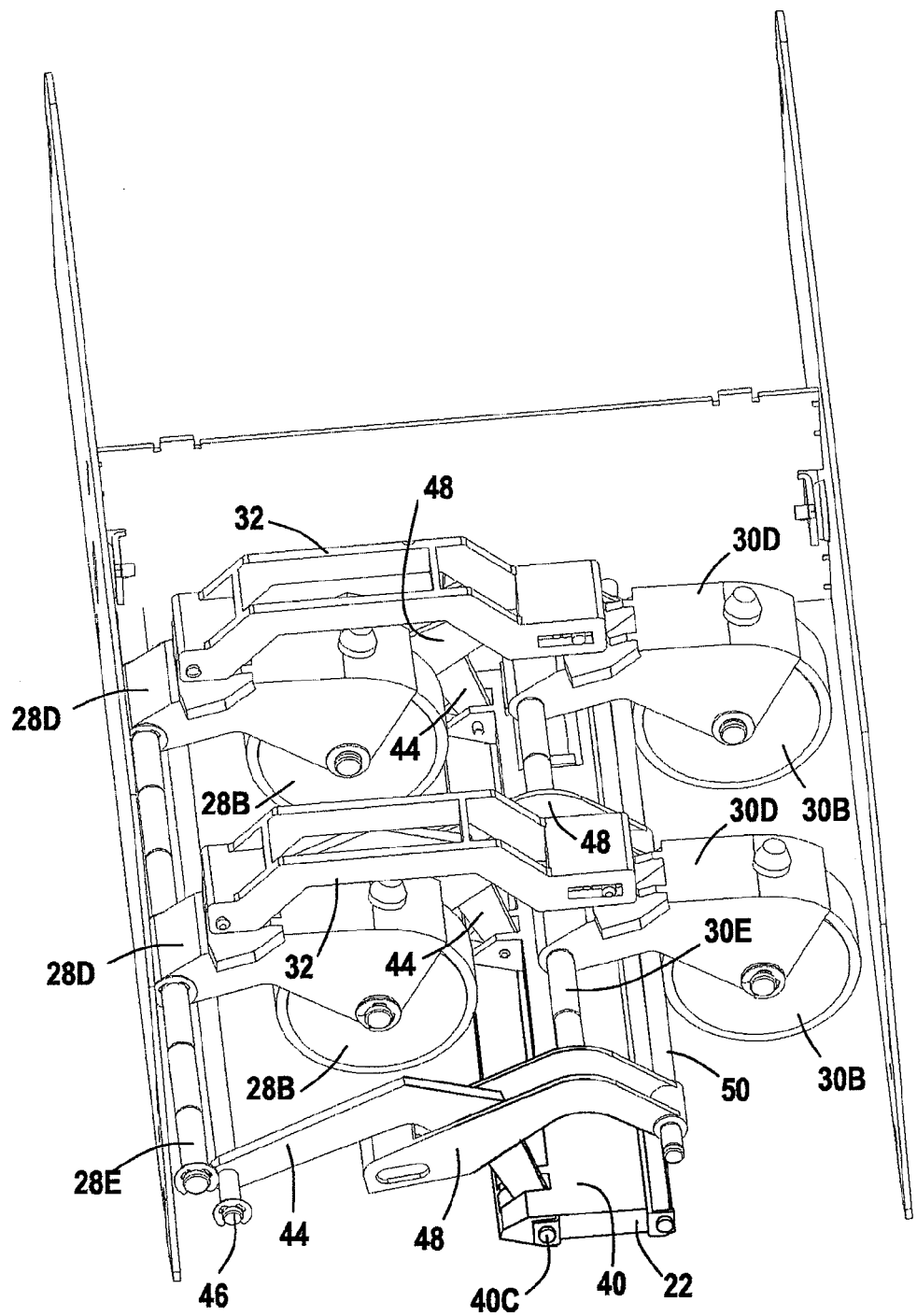
Figure 5:
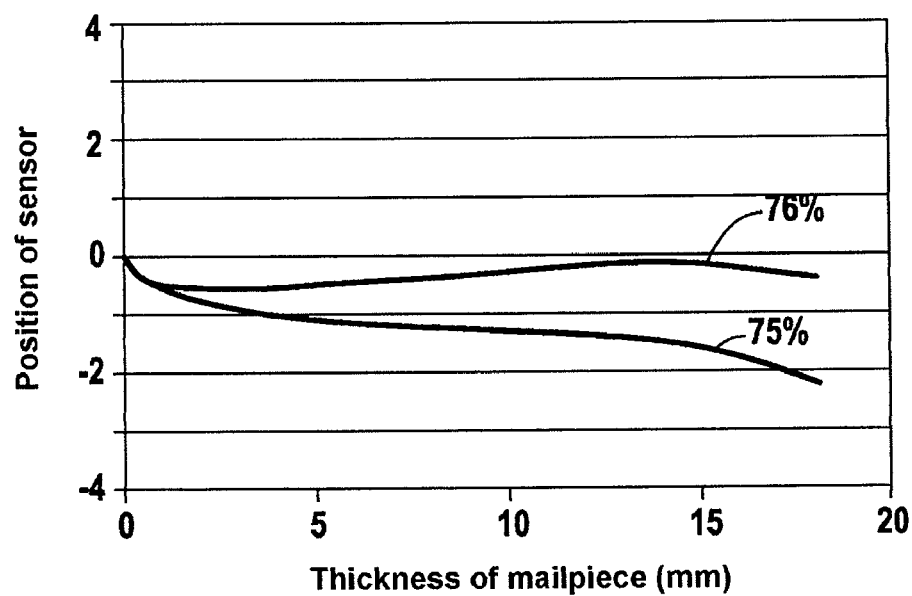
FIG. 5 shows curves that, for various thickness of mailpiece and for different positions of the bearing zone between levers, indicate how the position of the image sensor varies relative to the top face of the mailpiece in the scanner device of the invention.
Figure 6:
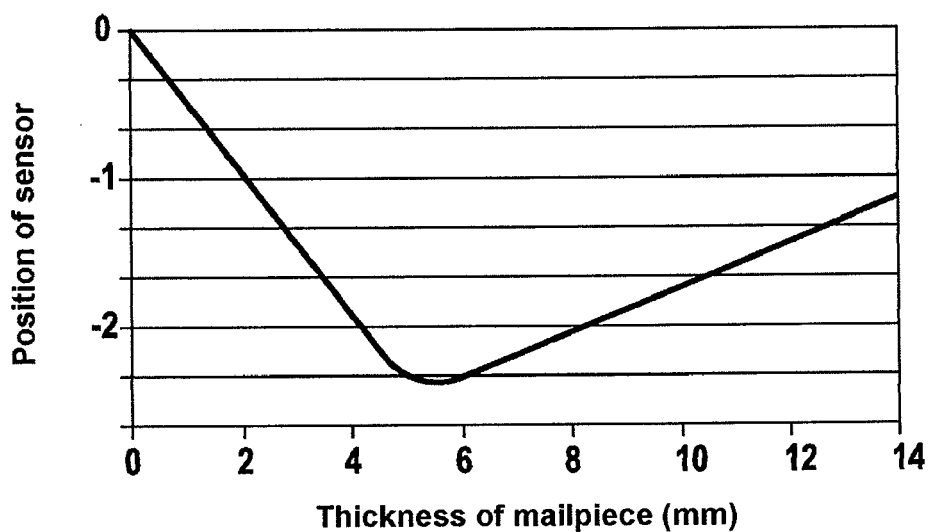
FIG. 6 shows a curve that, for various thickness of mailpiece, indicates how the position of the image sensor varies relative to the top face of the mailpiece in a prior art scanner device.

In accordance with the invention, and as shown in perspective in FIG. 4, the linear contact image sensor 22 and its support 40, whose walls are extended by an upstream deflector 40A and by a downstream deflector 40B so as to make it easier for the sensor to rise onto the mailpiece and to descend therefrom, are hinged to one end of a drive lever 44 or of each of a plurality of drive levers 44, the other end of the drive lever itself being hinged to a first common hinge pin 46 secured to the stationary portion 38 of the module and disposed upstream from the rotation pins 28C of the front conveyor rollers at a height not less than the maximum thickness of a mailpiece that can be conveyed, but less than the height of the stationary hinge pin 28E of the forks for supporting the front conveyor rollers, i.e., in practice, substantially in the same plane as the rotation pins 28C in their neutral rest positions. Each first drive lever is in the shape of a bridge whose curvature is accentuated to pass over the rotation pin 28C and its bottom face has a bearing zone 44A designed to rest on a raise bar 48A of a second drive lever 48, one end of which is provided with a slot 48B through which it is designed for the corresponding above-mentioned rotation pin 28C of the front conveyor rollers to pass, the other end of said second drive lever being hinged to a second common hinge pin 50 that is secured to the stationary portion 38 of the module and that is disposed downstream from the rotation pins 28C of the front conveyor rollers, and more precisely downstream from the stationary hinge pin 30E of the forks supporting the back conveyor rollers but upstream from the rotation pins 30C of said back transport rollers, at a height greater than the maximum thickness of a mailpiece but less than the height of the stationary hinge pin 30E, preferably substantially in the same plane as the common hinge pin. This second lever is also in the shape of a bridge whose curvature is accentuated to pass over the stationary hinge pin 30E of the forks for supporting the back conveyor rollers, so that the two levers together substantially form an upside-down W figure.

The scanning is performed as follows.

On entering the module, the mailpiece firstly raises the front upper conveyor rollers, thereby automatically raising the corresponding second drive lever, the second end of which is connected to the rotation pin of the corresponding one of said rollers. The second lever being raised then, directly or with a slight delay depending on whether the raise bar is in contact with the corresponding bearing zone, raises the first drive lever which then in turn raises the support for the contact image sensor. Thus, the sensor is raised before the mailpiece comes into contact with it, and the impact with the leading edge of the mailpiece is thus partially attenuated. Similarly, through the effect of the ties, the back upper conveyor rollers are also raised before the mailpiece reaches them.

The mailpiece conveyed by the motor-driven lower conveyor rollers then continues to advance through the module under the image sensor that proceeds to perform the scanning while the mailpiece is advancing in this way until the back portion of the mailpiece comes out of engagement with the front conveyor rollers, thereby causing the upper rollers to fall back down to their initial rest positions and, correlatively, causing the second drive levers to be lowered. However, since, at this time, the image sensor is still in contact with the mailpiece, the first drive lever does not move, thereby causing the raise bar to be released from the bearing zone, and it is only once the scanning is complete and once the back portion of the mailpiece has gone past the image sensor that said image sensor falls back down again and returns to its initial position, entraining the first lever with it as it descends, until said first lever also returns to is initial rest position in which its bearing zone is in contact with the raise bar of the second lever.

However, as mentioned above, it can be preferable to leave clearance between said bearing zone and the raise bar, which clearance is typically in the range 0.2 mm to 2 mm, so as to offset the raising of the image sensor relative to the raising of the front upper conveyor rollers. When the mailpiece arrives at the roller, the vertical velocity of the roller and thus of the lever is then very large, which, for high conveying speeds of approximately in the range 1 meter per second (m/s) to 2 m/s, might damage the image sensor.

It should be noted that, although it can be relatively easy to move the image sensor with a single set of first and second drive levers, it is naturally possible to move it with two or more sets depending on whether the module has one or more series of drive rollers per set of superposed conveyor rollers. Thus, with superposed sets of conveyor rollers, each set comprising two series of conveyor rollers, it is possible to provide a single set of first and second drive levers disposed between said two series of rollers, two sets of first and second drive levers disposed on either side of said two series, or indeed three sets of first and second drive levers disposed firstly between the two series and secondly on either side of said two series. It should also be noted that it is also possible to make provision for an asymmetric configuration with two sets of first and second drive levers flanking one of the two series of conveyor rollers.

What is claimed is:

1. A scanner device for scanning mailpieces, which scanner device comprises, disposed downstream from a set of conveyor rollers for conveying said mailpieces through a module of a franking system:

a contact image sensor or "CIS" disposed in a direction perpendicular to the conveying direction in which the mailpieces are conveyed through said module; and a support to which said sensor is fastened, said support being mounted to pivot at one end of at least one first drive lever, the other end of which is itself mounted to pivot about a first common hinge pin secured to a stationary portion of said module and disposed upstream from said set of conveyor rollers, so as to make it possible for said contact image sensor to move vertically;

wherein said scanner device further comprises at least one second drive lever one end of which is mounted to pivot about a second common hinge pin secured to said stationary portion of said module and disposed downstream from said set of conveyor rollers, the other end of said second drive lever, by being moved synchronously with the vertical movement of said set of conveyor rollers, moving said contact image sensor via said first drive lever.

2. A scanner device according to claim 1, wherein, at a determined distance from said second common hinge pin, said second drive lever is provided with a raise bar designed to co-operate with a bearing zone of said first drive lever to raise said first drive lever under the action of said vertical movement of said set of transport rollers, thereby positioning said contact image sensor relative to a top face of said mailpiece substantially identically regardless of the thickness of said mailpiece.

3. A scanner device according to claim 2, wherein said determined distance lies in the range 75% of the total length of said second drive lever to 76% of the total length of said second drive lever.

4. A scanner device according to claim 2, wherein, in the absence of any mailpiece, clearance is provided between said bearing zone and said raise bar so as to offset the rise of said contact image sensor relative to the vertical movement of said set of conveyor rollers.

5. A scanner device according to claim 1, wherein said second common hinge pin is disposed at a height greater than the maximum thickness of each of said mailpieces that can be conveyed through said module.

6. A scanner device according to claim 1, wherein each of said first and second drive levers is in the shape of a bridge whose curvature is accentuated so that the two levers together substantially form an upside-down W figure.

7. A scanner device according to claim 1, wherein said contact image sensor is formed of an integrated module comprising adjacent semiconductor detector cells, collimation optics, and a light system.

8. A scanner device according to claim 1, that is mounted in an independent module of the franking system.

9. A scanner device according to claim 1, that is mounted in one of the following modules of the franking system: feeder; postal scales; franking machine; and folder/stuffer.

* * * * *